(12) United States Patent
Ide et al.

(10) Patent No.: US 11,208,579 B2
(45) Date of Patent: Dec. 28, 2021

(54) CURABLE RESIN COMPOSITION AND ADHESIVE FOR BONDING STRUCTURAL MATERIAL USING COMPOSITION

(71) Applicant: ADEKA CORPORATION, Tokyo (JP)

(72) Inventors: Mitsunori Ide, Saitama (JP); Keisuke Ota, Saitama (JP); Tamotsu Nagamatsu, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 16/319,352

(22) PCT Filed: Jun. 13, 2017

(86) PCT No.: PCT/JP2017/021755
§ 371 (c)(1),
(2) Date: Jan. 21, 2019

(87) PCT Pub. No.: WO2018/020875
PCT Pub. Date: Feb. 1, 2018

(65) Prior Publication Data
US 2019/0249047 A1 Aug. 15, 2019

(30) Foreign Application Priority Data
Jul. 29, 2016 (JP) .............................. JP2016-150275

(51) Int. Cl.
| C09J 163/00 | (2006.01) |
| C09J 175/04 | (2006.01) |
| C09J 11/06 | (2006.01) |
| C08G 18/80 | (2006.01) |
| C08G 59/20 | (2006.01) |
| C08G 18/58 | (2006.01) |
| C08G 59/14 | (2006.01) |

(52) U.S. Cl.
CPC ............ *C09J 163/00* (2013.01); *C08G 18/58* (2013.01); *C08G 18/80* (2013.01); *C08G 59/14* (2013.01); *C08G 59/20* (2013.01); *C09J 11/06* (2013.01); *C09J 175/04* (2013.01)

(58) Field of Classification Search
CPC ....................................................... C09J 163/00
See application file for complete search history.

(56) References Cited

U.S. PATENT DOCUMENTS

| 4,692,382 | A | * | 9/1987 | Schmitt | ..................... | B05D 7/16 |
| | | | | | | 428/414 |
| 5,429,880 | A | * | 7/1995 | Kubota | ..................... | B05D 7/51 |
| | | | | | | 428/623 |
| 2007/0221890 | A1 | * | 9/2007 | Gan | ................... | C07F 9/657172 |
| | | | | | | 252/601 |
| 2013/0183499 | A1 | * | 7/2013 | Kido | ..................... | H05K 3/0058 |
| | | | | | | 428/195.1 |
| 2014/0205832 | A1 | * | 7/2014 | Jeong | ...................... | C08L 23/28 |
| | | | | | | 428/319.3 |
| 2015/0017447 | A1 | * | 1/2015 | Moravek | ................... | C09D 5/24 |
| | | | | | | 428/413 |
| 2016/0264815 | A1 | * | 9/2016 | Joege | ................... | C09D 167/00 |
| 2016/0342085 | A1 | * | 11/2016 | Sakai | ..................... | G03F 7/0385 |
| 2018/0179422 | A1 | * | 6/2018 | Hartinger | ................ | C08L 63/00 |
| 2018/0210336 | A1 | * | 7/2018 | Sakai | ...................... | G03F 7/004 |

FOREIGN PATENT DOCUMENTS

| CN | 101193975 | 6/2008 |
| CN | 101842408 | 9/2010 |
| EP | 0703259 | 3/1996 |
| JP | H03-103423 | 4/1991 |
| JP | H06145629 | 5/1994 |
| JP | H0741750 | 2/1995 |
| JP | 2004269679 | 9/2004 |
| JP | 2006077115 | 3/2006 |
| JP | 2007083525 | 4/2007 |
| JP | 2007185915 | 7/2007 |
| JP | 2008239890 | 10/2008 |
| JP | 2012082347 | 4/2012 |
| WO | 2006132093 | 12/2006 |

OTHER PUBLICATIONS

International Search Report (Form PCT/ISA/210) of PCT/JP2017/021755, dated Sep. 5, 2017, with English translation thereof, pp. 1-4.
"Office Action of China Counterpart Application", dated Sep. 15, 2020, with English translation thereof, p. 1-p. 13.
"Office Action of China Counterpart Application" with English translation thereof, dated Jul. 27, 2021, p. 1-p. 12.

* cited by examiner

*Primary Examiner* — Megan McCulley
(74) *Attorney, Agent, or Firm* — JCIP Global Inc.

(57) ABSTRACT

To show a curable resin composition suitable as an adhesive for bonding a structural material having good adhesiveness to aluminum in particular. A curable resin composition containing (A1) phosphoric acid-modified epoxy resin obtained by reacting a phosphoric acid (a1) and an epoxy compound (a2) (excluding a urethane-modified epoxy resin and a urethane-modified chelate epoxy resin); and (A2) an epoxy resin (excluding component (A1)); (B) a block urethane; and (C) a latent curing agent, in which a phosphorus content in a total mass of component (A1) and component (A2) is 0.01 to 2.0% by mass.

4 Claims, No Drawings

CURABLE RESIN COMPOSITION AND ADHESIVE FOR BONDING STRUCTURAL MATERIAL USING COMPOSITION

CROSS-REFERENCE TO RELATED APPLICATION

This application is a 371 application of the international PCT application serial no. PCT/JP2017/021755, filed on Jun. 13, 2017, which claims the priority benefit of Japan application no. 2016-150275, filed on Jul. 29, 2016. The entirety of each of the abovementioned patent applications is hereby incorporated by reference herein and made a part of this specification.

TECHNICAL FIELD

The present invention relates to a curable resin composition containing a phosphoric acid-modified epoxy resin, a blocked urethane, and a latent curing agent. More specifically, the present invention relates to a curable resin composition suitable as an adhesive for bonding a structural material for which a cured product is particularly excellent in adhesiveness with an aluminum material in a wide temperature range from low temperatures to high temperatures.

BACKGROUND ART

Industries applying structural material bonding techniques range from the field of transportation equipment (automobiles, railway vehicles, aircraft, and the like), the field of energy (power generation plants, and the like), the field of infrastructure (bridges, buildings, and the like), and the like. In the automobile industry, materials mainly made of iron have been used for automobile bodies and engines, but there is a demand for materials considering the environment and safety such as the regulation of exhaust gases such as $CO_2$ and improvement of fuel consumption, and materials such as aluminum and resin materials are being actively developed as alternative materials to iron. In particular, aluminum is a material which has attracted attention in terms of being superior in recyclability compared with resin materials in addition to the points that the specific gravity thereof is small at approximately ⅓ as compared with iron, the thermal conductivity thereof is high, and the corrosion resistance thereof is good.

Examples of methods of bonding materials such as iron and aluminum used for automobiles include fusion bonding using welding techniques, and, in such methods, the materials are bonded at "points" or "lines". In contrast, in bonding methods using adhesives, there is an advantage in that the strength, such as the rigidity, of the bonded body increases since the materials are bonded together by "faces".

Adhesives for bonding a structural material which adhere members of structural bodies, such as automobiles, are described in, for example, PTL 1 and PTL 2. PTL 1 describes an adhesive method using a resin composition obtained by adding a nitrile rubber component to a compound, which is obtained by reacting a copolymer of a monovinyl-substituted aromatic compound polymer block and a compound including a conjugated diolefin polymer block, with respect to an epoxy resin. In this method, it is possible to obtain an epoxy resin composition having excellent storage stability and maintaining high adhesiveness for a long period. However, the adhesiveness between members at low temperatures was not satisfactory.

PTL 2 describes that a urethane prepolymer is reacted with an epoxy resin to produce a compound having a urethane bond in an epoxy resin, and the obtained blocked urethane is combined with a latent curing agent. The adhesive for bonding a structural material obtained by this method is preferable in terms of the members being able to be adhered to each other over a wide temperature range from low temperatures to high temperatures. However, the adhesiveness to aluminum is not sufficient and the method is unable to provide the performances which are in high demand following recent changes in materials in the automobile industry.

PTL 3 describes a curable resin composition which is suitable as an automobile structural adhesive and which contains a main component, which is formed of 95 to 10% by mass of a urethane-modified chelate epoxy resin obtained by reacting a polyepoxy compound, phosphoric acid, and polyurethane and 5 to 90% by mass of a blocked urethane, along with 1 to 40 parts by mass of a latent curing agent with respect to 100 parts by mass of the main component. However, the adhesiveness to aluminum substrates is not considered here.

CITATION LIST

Patent Literature

[PTL 1] Japanese Patent Application Laid-Open No. H03-103423
[PTL 2] WO2006/132093
[PTL 3] Japanese Patent Application Laid-Open No. 2008-239890

SUMMARY OF INVENTION

Technical Problem

The problem to be solved by the present invention is to provide a curable resin composition suitable as an adhesive for bonding a structural material which maintains adhesiveness in a wide temperature range from low temperatures to high temperatures and which also has good adhesiveness to objects other than steel sheets, in particular, aluminum.

Solution to Problem

Therefore, the present inventors conducted intensive studies and found that a curable resin composition, which contains a phosphoric acid-modified epoxy resin having a phosphorus atom in the molecular structure thereof, a blocked urethane, and a latent curing agent, solves the problems described above. It was found that such a curable resin composition is provided with both good adhesiveness to a structural material other than a steel sheet due to the phosphoric acid-modified epoxy resin and well-balanced adhesiveness from low temperatures to high temperatures due to the blocked urethane, and is suitable as an adhesive for bonding a structural material. That is, the present invention is as follows.

(Invention 1)
A curable resin composition including (A1) a phosphoric acid-modified epoxy resin obtained by reacting a phosphoric acid (a1) and an epoxy compound (a2) (excluding a urethane-modified epoxy resin and a urethane-modified chelate epoxy resin); and (A2) an epoxy resin (excluding component (A1)); (B) a block urethane; and (C) a latent curing agent.

Here, a phosphorus content in a total mass of component (A1) and component (A2) is 0.01 to 2.0% by mass.

(Invention 2)

The curable resin composition, in which the epoxy compound (a2) is a bisphenol type epoxy resin.

(Invention 3)

The curable resin composition, in which the blocked urethane (B) is a compound obtained by reacting a blocking agent (b4) with a polyurethane resin (b3) obtained by reacting a polyol (b1) and a polyisocyanate (b2).

(Invention 4)

The curable resin composition, in which the latent curing agent (C) is at least one compound selected from the group consisting of dicyandiamide, modified polyamine, hydrazides, 4,4'-diaminodiphenylsulfone, boron trifluoride amine complex salt, ureas, and melamine.

(Invention 5)

An adhesive for bonding a structural material, using any of the curable resin compositions.

(Invention 6)

The adhesive for bonding a structural material, which is used for bonding aluminum materials.

Advantageous Effects of Invention

The adhesive for bonding a structural material of the present invention is brought about by intra-molecular cohesive force of the blocked urethane component (B) and a phosphoric acid skeleton introduced by the phosphoric acid-modified epoxy resin (A1). The adhesive for bonding a structural material of the present invention has improved adhesiveness to members other than steel sheets, in particular, adhesiveness to aluminum materials, as compared with the related art. The adhesive for bonding the structural material of the present invention is suitable as an adhesive for bonding a structural material which considers the environment and the safety required for the automobile industry.

A description will be given below of an embodiment of the curable resin composition of the present invention. The curable resin composition of the present invention contains (A1) a phosphoric acid-modified epoxy resin obtained by reacting a phosphoric acid (a1) and an epoxy compound (a2), (A2) another epoxy resin, (B) a blocked urethane, and (C) a latent curing agent.

[(A1) Phosphoric Acid-Modified Epoxy Resin]

The phosphoric acid-modified epoxy resin (A1) used in the present invention is a modified product of an epoxy compound (a2) obtained by reacting the phosphoric acid (a1) and the epoxy compound (a2). The phosphoric acid (a1) is not limited as long as the phosphoric acid (a1) is a compound having a phosphate bond in the molecule. As the phosphoric acid (a1), it is possible to use polyphosphoric acids such as phosphoric acid (orthophosphoric acid: $H_3PO_4$), phosphorous acid ($H_3PO_3$), hypophosphorous acid ($H_3PO_2$), phosphonic acid ($H_3PO_3$), diphosphoric acid (pyrophosphoric acid: $H_4P_2O_7$), and triphosphoric acid. A preferable phosphoric acid (a1) is phosphoric acid ($H_3PO_4$).

As the epoxy compound (a2), it is possible to use any compound having at least one epoxy group in the molecule without particular limitation. Examples thereof include reactive diluents having one epoxy group such as n-butyl glycidyl ether, alkyl glycidyl ether having 12 to 14 carbon atoms, allyl glycidyl ether, 2-ethylhexyl glycidyl ether, styrene oxide, phenyl glycidyl ether, cresyl glycidyl ether, p-sec-butyl phenyl glycidyl ether, t-butyl phenylglycidyl ether, glycidyl methacrylate, and tertiary carboxylic acid glycidyl ester; reactive diluents having two epoxy groups such as ethylene glycol diglycidyl ether, propylene glycol diglycidyl ether, butanediol diglycidyl ether, 1,6-hexanediol diglycidyl ether, and neopentyl glycol diglycidyl ether; reactive diluents having three epoxy groups such as trimethylolpropane triglycidyl ether and glycerin triglycidyl ether; bisphenol type epoxy resins such as bisphenol A type epoxy resins and bisphenol F type epoxy resins; biphenyl type epoxy resins such as biphenyl type epoxy resins and tetramethyl biphenyl type epoxy resins; dicyclopentadiene type epoxy resins; naphthalene type epoxy resins; alicyclic epoxy resins obtained from cyclohexane dimethanol, hydrogenated bisphenol A, or the like; novolac type epoxy resins such as phenol novolac type epoxy resins, cresol novolac type epoxy resins, bisphenol A novolac type epoxy resins, epoxy compounds which are condensates of a phenol and an aromatic aldehyde having a phenolic hydroxyl group, and biphenyl novolac type epoxy resins; triphenylmethane type epoxy resins; tetraphenyl ethane epoxy resins; dicyclopentadiene-phenol addition reaction type epoxy resins; phenol aralkyl type epoxy resins, and the like. These compounds may be used alone, or two or more may be used in combination.

Among these, it is preferable to use bisphenol type epoxy resins, biphenyl type epoxy resins, and alicyclic epoxy resins, which are easy to obtain, inexpensive, and have good physical properties as a cured product, and it is more preferable to use bisphenol type epoxy resins.

The phosphoric acid-modified epoxy resin (A1) used in the present invention is a phosphorus atom-containing epoxy compound having an epoxy group at a terminal. The phosphoric acid-modified epoxy resin (A1) is obtained by reacting the phosphoric acid (a1) and the epoxy compound (a2) at 20 to 100° C. It is also possible to carry out this reaction in the presence of a solvent and remove the solvent after completion of the reaction. The amounts of the phosphoric acid (a1) and the epoxy compound (a2) used in the reaction are determined such that the epoxy group number of the epoxy compound (a2) is larger than the active hydrogen number in the phosphoric acid (a1). In a case of using a plurality of epoxy compounds as the epoxy compound (a2), first, under the condition that the active hydrogen number included in (a1) is larger than the epoxy group number included in the epoxy compound (a2), the phosphoric acid (a1) and at least one type of the epoxy compound (a2) are reacted to synthesize a phosphorus-modified epoxy compound in which active hydrogen derived from the phosphoric acid (a1) remains, next, this phosphorus-modified epoxy compound is reacted with another at least one type of epoxy compound (a2), making it possible to finally obtain a phosphorus atom-containing epoxy compound having an epoxy group at the terminal as the component (A1).

In a case where the epoxy compound (a2) is excessively used in the synthesis of the phosphoric acid-modified epoxy resin (A1), the unreacted, that is, unmodified by the phosphorus atom, the epoxy compound (a2) remains. In such a case, the unreacted epoxy compound (a2) functions as the epoxy resin (A2) described below (excluding the component (A1)).

As solvents, it is possible to use ketones such as methyl ethyl ketone, methyl amyl ketone, diethyl ketone, acetone, methyl isopropyl ketone, propylene glycol monomethyl ether acetate, and cyclohexanone; ethers such as tetrahydrofuran, 1,2-dimethoxyethane, 1,2-diethoxyethane, and propylene glycol monomethyl ether; esters such as ethyl acetate and n-butyl acetate; aromatic hydrocarbons such as benzene, toluene, and xylene;

halogenated aliphatic hydrocarbons such as carbon tetrachloride, chloroform, trichloroethylene, and methylene chloride;

halogenated aromatic hydrocarbons such as chlorobenzene. Among these solvents, from the viewpoint of easy removal after the reaction, ketones are preferable, and methyl ethyl ketone and methyl isopropyl ketone are more preferable.

Here, the bisphenol type epoxy resins and novolac type epoxy resins which are able to be used as the epoxy compound (a2) are not single repeating units, and it is difficult to define the overall structure thereof using chemical formulas or General Formulas. Moreover, in the process of synthesizing the phosphoric acid-modified epoxy resin (A1) of the present invention, there is a possibility that a side reaction will occur in which a hydroxyl group formed from the epoxy compound (a2) reacts with another epoxy group in the epoxy compound (a2) and, for this reason, the structure of the phosphoric acid-modified epoxy resin (A1) may become complicated. Accordingly, the structure of the phosphoric acid-modified epoxy resin (A1) of the present invention is not a single structure but a great variety of structures, and it is not possible to define the structure thereof using a single chemical bond or General Formula. Therefore, the phosphoric acid-modified epoxy resin (A1) used in the present invention has to be defined by the production method thereof.

In the production process of the phosphoric acid-modified epoxy resin (A1) of the present invention, the compound used as the modifier of the starting material epoxy compound (a2) is limited to the phosphoric acid (a1). Accordingly, a urethane-modified epoxy resin using only polyurethane as the epoxy resin modifier, and a urethane-modified chelate epoxy resin using both polyurethane and phosphoric acid as the epoxy resin modifier are excluded from the phosphoric acid-modified epoxy resin (A1) of the present invention. In this respect, the present invention is novel with respect to products of the related art such as the curable resin compositions described in PTLs 2 and 3.

The urethane-modified epoxy resin excluded from the phosphoric acid-modified epoxy resin (A1) of the present invention is typically a urethane-modified epoxy resin obtained by reacting a polyepoxy compound and polyurethane obtained from a polyhydroxy compound and excess polyisocyanate compound, as described in PTL 2. The details thereof are as described in PTL 2.

The urethane-modified chelate epoxy resin excluded from the phosphoric acid-modified epoxy resin (A1) of the present invention is typically a urethane-modified chelate epoxy resin obtained by reacting a polyepoxy compound, a phosphoric acid, or polyurethane, as described in PTL 3, specifically, a urethane-modified chelate epoxy resin obtained by reacting a phosphoric acid-modified epoxy resin and polyurethane, or a urethane-modified chelate epoxy resin obtained by further reacting a phosphoric acid in a urethane-modified epoxy resin obtained by reacting a polyepoxy compound and polyurethane obtained by reacting a polyhydroxy compound and excess polyisocyanate compound and having an isocyanate content of 0.1 to 10% by mass. The details thereof are as described in PTL 3.

[(A2) Epoxy Resin (Excluding Component (A1))]

As the epoxy resin (A2) used in the present invention, it is possible to use a compound having at least one epoxy group in the molecule without any limitation as long as the compound is different from the component (A1). Examples of such an epoxy resin (A2) include epoxy resins including no phosphorus atom in the molecule, for example, reactive diluents having one epoxy group such as n-butyl glycidyl ether, alkyl glycidyl ether having 12 to 14 carbon atoms, allyl glycidyl ether, 2-ethylhexyl glycidyl ether, styrene oxide, phenyl glycidyl ether, cresyl glycidyl ether, p-sec-butyl phenyl glycidyl ether, t-butyl phenyl glycidyl ether, glycidyl methacrylate, and tertiary carboxylic acid glycidyl ester; reactive diluents having two epoxy groups such as ethylene glycol diglycidyl ether, propylene glycol diglycidyl ether, butanediol diglycidyl ether, 1,6-hexanediol diglycidyl ether, and neopentyl glycol diglycidyl ether; reactive diluents having three epoxy groups such as trimethylolpropane triglycidyl ether and glycerin triglycidyl ether; bisphenol type epoxy resins such as a bisphenol A type epoxy resin and a bisphenol F type epoxy resin; biphenyl type epoxy resins such as a biphenyl type epoxy resin and a tetramethylbiphenyl type epoxy resin; dicyclopentadiene type epoxy resins; naphthalene type epoxy resins; alicyclic epoxy resins obtained from cyclohexane dimethanol, hydrogenated bisphenol A, and the like; novolac type epoxy resins such as a phenol novolac type epoxy resin, a cresol novolac type epoxy resin, a bisphenol A novolac type epoxy resin, epoxy compounds which are condensates of a phenol and an aromatic aldehyde having a phenolic hydroxyl group, and biphenyl novolac type epoxy resins; triphenylmethane type epoxy resins; tetraphenylethane type epoxy resins; dicyclopentadiene-phenol addition reactive epoxy resins; and phenol aralkyl epoxy resins. These compounds may be used alone, or two or more may be used in combination.

Among these epoxy compounds, it is preferable to use a reactive diluent having at least one epoxy group and a bisphenol type epoxy resin in terms of the viscosity of the composition, the physical properties of the cured product, availability, and the like. As described above, in the curable resin composition of the present invention, a part or more of the epoxy resin (A2) (excluding the component (A1)) may be formed from an unreacted epoxy compound (a2) which is not introduced into the phosphoric acid-modified epoxy resin (A1).

[Blending Amount of Component (A1) and Component (A2)]

The component (A1) and the component (A2) are mixed such that the phosphorus content in the total mass of the component (A1) and component (A2) included in the curable resin composition of the present invention is an amount of 0.01 to 2.0% by mass. In order to balance the viscosity of the curable resin composition and the adhesiveness of the cured product, the phosphorus content in the total mass of the component (A1) and component (A2) is preferably 0.01 to 1.0% by mass, and more preferably 0.01 to 0.5% by mass. In a case where the phosphorus content is less than 0.01% by mass, the adhesiveness to the member is decreased when made into a cured product. In addition, in a case where the phosphorus content is more than 2.0% by mass, the viscosity of the curable resin composition is high and the workability decreases remarkably.

[(B) Blocked urethane]

The blocked urethane (B) used in the present invention is not particularly limited as long as the blocked urethane (B) is a product obtained by reacting a blocking agent with an isocyanate compound having at least one isocyanate group. Looking at the adhesiveness of the curable resin composition to the structural member and the flexibility of the cured product thereof, the preferable (B) blocked urethane is a compound obtained by further reacting a blocking agent (b4) with the polyurethane resin (b3) obtained by reacting a polyol (b1), a polyisocyanate (b2), and an optional catalyst at 40 to 150° C.

As the polyol (b1), it is possible to use a compound having at least two hydroxyl groups in the molecule without limitation. As the polyol (b1), it is possible to use, for example, polyester polyol, polycarbonate diol, polyether polyol, and the like. These compounds may be used alone, or two or more may be used in combination.

As the polyester polyol, for example, it is possible to use a compound obtained by subjecting a low molecular weight polyol and a polycarboxylic acid to an esterification reaction, a compound obtained by a ring-opening polymerization reaction of a cyclic ester compound such as ε-caprolactone or γ-valerolactone, copolyesters of the above, or the like.

As the low molecular weight polyol, for example, it is possible to use aliphatic polyols such as ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, 2-methyl-1,8-octanediol, glycerin, trimethylolpropane, ditrimethylolpropane, tritrimethylolpropane, and pentaerythritol; aliphatic cyclic structure-containing polyols such as 1,4-cyclohexanedimethanol and hydrogenated bisphenol A; and bisphenol type polyols such as bisphenol A, alkylene oxide adducts of bisphenol A, bisphenol S, and alkylene oxide adducts of bisphenol S.

As the polycarboxylic acid, for example, it is possible to use aliphatic polycarboxylic acids such as succinic acid, adipic acid, suberic acid, azelaic acid, sebacic acid, dodecane dicarboxylic acid, and dimer acid; alicyclic polycarboxylic acids such as 1,4-cyclohexane dicarboxylic acid or cyclohexane tricarboxylic acid; aromatic polycarboxylic acids such as orthophthalic acid, isophthalic acid, terephthalic acid, 1,4-naphthalenedicarboxylic acid, 2,3-naphthalenedicarboxylic acid, 2,6-naphthalene dicarboxylic acid, biphenyl dicarboxylic acid, trimellitic acid, and pyromellitic acid; and anhydrides or ester derivatives thereof, either alone or in a combination of two or more.

As the polycarbonate diol, it is possible to use polycarbonate diols obtained by reacting a carbonate ester and/or phosgene with a polyol described below. As the carbonate ester, for example, it is possible to use dimethyl carbonate, diethyl carbonate, methylethyl carbonate, ethylene carbonate, propylene carbonate, butylene carbonate, diphenyl carbonate, dinaphthyl carbonate, phenyl naphthyl carbonate, and the like. As the polyol, it is possible to use aliphatic diols such as ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, and 2-methyl-1,8-octanediol. Further, as the polyols, it is also possible to use low molecular weight dihydroxy compounds such as 1,4-cyclohexanedimethanol, hydroquinone, resorcin, bisphenol A, bisphenol F, and 4,4'-biphenol; polyether polyols such as polyethylene glycol, polypropylene glycol, and polytetramethylene glycol; polyester polyols such as polyhexamethylene adipate, polyhexamethylene succinate, and polycaprolactone.

As the polyether polyol, it is possible to use a polyether polyol obtained by addition polymerization of an alkylene oxide with one or two or more kinds of compounds having two or more active hydrogen atoms as an initiator. As the initiator, it is possible to use water, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl 1,3-propanediol, 3-methyl-1,5-pentanediol, 2-ethyl-1,3-hexanediol, 2-methyl-1,8-octanediol, glycerin, diglycerin, trimethylolpropane, ditrimethylolpropane, tritrimethylolpropane, 1,2,6-hexanetriol, triethanolamine, triisopropanolamine, pentaerythritol, dipentaerythritol, sorbitol, sucrose, ethylenediamine, N-ethyl diethylene triamine, 1,2-diaminopropane, 1,3-diaminopropane, 1,2-diaminobutane, 1,3-diaminobutane, 1,4-diaminobutane, diethylenetriamine, phosphoric acid, acidic phosphate ester, and the like. As the alkylene oxide, for example, it is possible to use ethylene oxide, propylene oxide, butylene oxide, styrene oxide, epichlorohydrin, tetrahydrofuran, and the like.

The number average molecular weight of such a polyol (b1) is generally 1,000 to 10,000, and preferably 1,500 to 5,000 in view of availability. The compound to be used as the polyol (b1) is preferably a polyether polyol, and more preferably a propylene oxide adduct of glycerin, in terms of maintaining the flexibility of the cured product even at low temperatures and suppressing the viscosity of the blocked urethane to be low. As the polyisocyanate (b2), it is possible to use a compound having at least two isocyanate groups in the molecule without limitation.

As the polyisocyanate (b2), it is possible to use aromatic diisocyanates such as phenylene diisocyanate, tolylene diisocyanate, diphenylmethane diisocyanate, naphthalene diisocyanate, and xylylene diisocyanate; aliphatic or alicyclic structure-containing diisocyanates such as hexamethylene diisocyanate, lysine diisocyanate, cyclohexane diisocyanate, isophorone diisocyanate, 4,4'-dicyclohexylmethane diisocyanate, and tetramethylxylylene diisocyanate. Further, it is also possible to use a compound obtained by trimerizing the aromatic diisocyanate or the aliphatic or alicyclic structure-containing diisocyanate, and the like. Among these compounds, in terms of the durability of a cured product, an aliphatic or alicyclic structure-containing diisocyanate is preferable, and isophorone diisocyanate and/or 4,4'-dicyclohexylmethane diisocyanate is more preferable.

As the catalyst optionally used when synthesizing the polyurethane resin (b3) by the reaction between the polyol (b1) and the polyisocyanate (b2), for example, it is possible to use tertiary amines such as N,N,N',N'-tetramethylethylenediamine, N,N,N',N'-tetramethylpropylenediamine, N,N,N',N",N"-pentamethyldiethylenetriamine, N,N,N',N",N"-pentamethyl-(3-13 aminopropyl) ethylenediamine, N,N,N',N",N"-pentamethyldipropylenetriamine, N,N,N ',N'-tetramethylguanidine, 1,3,5-tris(N,N-dimethylaminopropyl) hexahydro-S-triazine, 1,8-diazabicyclo [5.0.4.0]undecene-7, triethylenediamine, N,N,N',N '-tetramethylhexamethylenediamine, N-methyl-N'-(2-dimethylaminoethyl) piperazine, N,N'-dimethylpiperazine, dimethyl cyclohexylamine, N-methylmorpholine, N-ethylmorpholine, bis(2-dimethylaminoethyl) ether, N,N-dimethyllaurylamine, 1-methylimidazole, 1,2-dimethylimidazole, 1-isobutyl-2-methylimidazole, and 1-dimethylaminopropylimidazole. In addition, it is also possible to use quaternary ammonium salts such as tetraalkylammonium halides such as tetramethylammonium chloride, tetraalkylammonium hydroxides such as tetramethylammonium hydroxide, and tetraalkylammonium organic acid salts such as tetramethylammonium 2-ethylhexanoate, and organic metal catalysts such as stannous diacetate, stannous dioctoate, stannous dioleate, stannous dilaurate, dibutyltin oxide, dibutyltin diacetate, dibutyltin dilaurate, dibutyltin dichloride, dioctyltin dilaurate, lead octanoate, lead naphthenate, nickel naphthenate, cobalt naphthenate, and the like. These catalysts may be used alone, or two or more may be used in combination. Among these catalysts, from the viewpoint of a reduced yellowing property and good reactivity, organic metal catalysts are preferable, and dibutyltin dilaurate or dioctyltin dilaurate is more preferable. The amount of the catalyst to be used is not particularly limited, but is preferably 0.001 to 1% by mass, and more preferably 0.01 to 0.1% by mass with respect to the total amount of component (b1) and component (b2).

In the synthesis of the polyurethane resin (b3) used in the present invention, the polyol (b1) is reacted with the polyisocyanate (b2) in an amount where the isocyanate group number of the polyisocyanate (b2) is larger than the hydroxyl group number of the polyol (b1), that is, an amount where the ratio (NCO/OH) of the isocyanate group number (NCO) of the polyisocyanate (b2) with respect to the hydroxyl group number (OH) of the polyol (b1) is greater than 1.0, preferably 1.2 to 1.8, and more preferably 1.3 to 1.7. Since the obtained polyurethane resin (b3) contains an isocyanate group, it is possible for the polyurethane resin (b3) to further react with the blocking agent (b4).

As the blocking agent (b4), for example, it is possible to use active methylene compounds such as malonic acid diesters (such as diethyl malonate), and acetylacetone and acetoacetic acid esters (such as ethyl acetoacetate); oxime compounds such as acetoxime, methyl ethyl ketoxime (MEK oxime), and methyl isobutyl ketoxime (MIBK oxime); monohydric alcohols such as methyl alcohol, ethyl alcohol, propyl alcohol, butyl alcohol, heptyl alcohol, hexyl alcohol, octyl alcohol, 2-ethylhexyl alcohol, isononyl alcohol, and stearyl alcohol, or isomers thereof; glycol derivatives such as methyl glycol, ethyl glycol, ethyl diglycol, ethyl triglycol, butyl glycol, and butyl diglycol; amine compounds such as dicyclohexylamine; phenols such as phenol, cresol, ethylphenol, n-propylphenol, isopropylphenol, butylphenol, tert-butylphenol, octylphenol, nonylphenol, dodecylphenol, cyclohexylphenol, chlorophenol, bromophenol, resorcin, catechol, hydroquinone, bisphenol A, bisphenol S, bisphenol F, and naphthol; ε-caprolactams and the like.

In terms of being able to lower the dissociation temperature of the blocking agent, as the blocking agent (b4), an oxime compound, an amine compound, a phenol, or ε-caprolactam is preferable, and MEK oxime, dicyclohexylamine, tert-butylphenol, and ε-caprolactam are more preferable.

The blocking agent (b4) is blended such that the total amount of reactable isocyanate groups in the polyurethane resin (b3) is an amount which is able to react with the blocking agent (b4). Specifically, the reactable isocyanate group content of the polyurethane resin (b3) is measured and calculated in accordance with JIS 1603-1, and the blocking agent (b4) having an equivalent weight isocyanate groups which are able to react or more is used.

In general, the amount of the blocked urethane (B) in the curable resin composition of the present invention is 10 to 90% by mass with respect to the total amount of the phosphoric acid-modified epoxy resin (A1), the epoxy resin (A2) (excluding the component (A1)), and the blocked urethane (B), preferably 15 to 70% by mass with respect to the total amount, and more preferably 20 to 50% by mass, from the viewpoint of the balance between the adhesiveness and strength of the cured product.

[(C) Latent Curing Agent]

As the latent curing agent (C) used in the present invention, it is possible to use at least one compound selected from the group consisting of dicyandiamide, modified polyamine, hydrazides, 4,4'-diaminodiphenylsulfone, boron trifluoride amine complex salt, ureas, and melamine. Examples of the modified polyamine include epoxy addition-modified products of amines, amidation-modified products of amines, acrylic acid ester modified products of amines, isocyanate modified products of amines, Mannich-modified products of amines, and the like.

Examples of the amines used in the modified polyamines include aliphatic polyamines such as ethylenediamine, diethylenetriamine, triethylenetetramine, tetraethylenepentamine, polyoxypropylenediamine, and polyoxypropylenetriamine; alicyclic polyamines such as isophoronediamine, menthendiamine, bis(4-amino-3-methyldicyclohexyl) methane, diaminodicyclohexylmethane, bis(aminomethyl) cyclohexane, N-aminoethylpiperazine, and 3,9-bis(3-aminopropyl)-2,4,8,10-tetraoxaspiro(5.5)undecane; mononuclear polyamines such as m-phenylenediamine, p-phenylenediamine, tolylene-2,4-diamine, tolylene-2,6-diamine, mesitylene-2,4-diamine, mesitylene-2,6-diamine, 3,5-diethyltolylene-2, 4-diamine, and 3,5-diethyltolylene-2,6-diamine; aromatic polyamines such as biphenylenediamine, 4,4-diaminodiphenylmethane, 2,5-naphthylenediamine, and 2,6-naphthylenediamine; imidazoles such as 2-methylimidazole, 2-ethyl-4-methylimidazole, 2-isopropylimidazole, 2-undecylimidazole, 2-heptadecylimidazole, 2-phenylimidazole, 2-phenyl-4-methylimidazole, and 2-aminopropylimidazole.

The above epoxy addition-modified product of the polyamines is a reaction product formed by a normal method using the above amines and various types of epoxy resins formed of phenyl glycidyl ethers, butyl glycidyl ethers, bisphenol A diglycidyl ethers, bisphenol F diglycidyl ethers, or glycidyl esters of carboxylic acids. The above amidation-modified product of the amines is a reaction product formed by a normal method using the above amines and carboxylic acids such as adipic acid, sebacic acid, phthalic acid, isophthalic acid, and dimer acid. The above acrylic acid-modified product of the amines is a reaction product formed by a normal method using the above amines with an acrylate ester compound such as ethyl acrylate, n-butyl acrylate, or 2-ethylhexyl acrylate. The above isocyanate-modified product of the amines is a reaction product formed by a normal method using the above amines with the compounds exemplified for the above polyisocyanate (b2), and the like. The above Mannich-modified product of the amines is a reaction product formed by a normal method using the above amines with aldehydes such as formaldehyde and phenols having a reactive site with at least one aldehyde in the nucleus such as phenol, cresol, xylenol, tertiary butylphenol, and resorcin.

As the hydrazide, it is possible to use oxalic acid dihydrazide, malonic acid dihydrazide, succinic acid dihydrazide, glutaric acid dihydrazide, adipic acid dihydrazide, suberic acid dihydrazide, azelaic acid dihydrazide, sebacic acid dihydrazide, phthalic acid dihydrazide, and the like.

As the ureas, it is possible to use 3-(p-chlorophenyl)-1, 1-dimethylurea, 3-(3,4-dichlorophenyl)-1,1-dimethylurea, 3-phenyl-1,1-dimethylurea, isophorone diisocyanate-dimethyl urea, tolylene diisocyanate-dimethyl urea, and the like.

In order to improve the storage stability of the curable resin composition of the present invention, one or more of the above compounds as the latent curing agent (C) may be used in combination with a phenolic resin. As the phenolic resin, it is possible to use, for example, compounds having two phenolic hydroxyl groups in one molecule such as resorcin, catechol, bisphenol A, bisphenol F, or substituted or unsubstituted biphenol; novolac type phenol resins obtained by condensation or co-condensation under an acidic catalyst of at least one phenolic compound selected from the group consisting of phenol compounds such as phenol, cresol, xylenol, resorcin, catechol, bisphenol A, bisphenol F, phenylphenol, and aminophenol and naphthol compounds such as α-naphthol, β-naphthol, and dihydroxynaphthalene, and aldehyde compounds such as formaldehyde, acetaldehyde, propionaldehyde, benzaldehyde, and salicylaldehyde; aralkyl type phenol resins such as phenol aralkyl resins and naphthol aralkyl resins synthesized from the phenolic compounds described above and dimethoxyparaxylene, bis(methoxymethyl) biphenyl, or the like; paraxylylene and/or metaxylylene-modified phenolic resins; melamine modified phenolic resins; terpene modified phenolic resins; dicyclopentadiene type phenolic resins and dicyclopentadiene type naphthol resins synthesized from the above phenolic compounds and dicyclopentadiene by copolymerization; cyclopentadiene modified phenolic resins; polycyclic aromatic ring modified phenolic resins; biphenyl type phenol resins; triphenyl methan type phenolic resins obtained by condensation or co-condensation under an acidic catalyst of the above phenolic compounds with an aromatic aldehyde compound such as benzaldehyde, or salicylaldehyde; phenolic resins obtained by copolymerizing two or more thereof, and the like. These phenol resins may be used alone, or two or more may be used in combination.

In order to obtain a curable resin composition exhibiting fast curability and high adhesiveness at low temperature, as a (C) latent curing agent, a dicyandiamide, or at least one compound selected from the group consisting of reaction products of imidazoles as an amine and epoxy resins (epoxy modified imidazoles), or ureas, are preferable. The (C) latent curing agent for use in the present invention is more preferably dicyandiamide, or 3-phenyl-1,1-dimethylurea.

The amount of the latent curing agent (C) is generally 1 to 50 parts by mass based on 100 parts by mass of the total amount of the component (A1), the component (A2), and the component (B), preferably 3 to 30 parts by mass from the balance of the viscosity and the curability of the composition, and more preferably 5 to 20 parts by mass.

[Other Components]

An inorganic filler may be added to the curable resin composition of the present invention, as necessary. As the inorganic filler, for example, it is possible to use silica such as fused silica and crystalline silica, powders such as magnesium hydroxide, aluminum hydroxide, zinc borate, zinc molybdate, calcium carbonate, silicon nitride, silicon carbide, boron nitride, calcium silicate, potassium titanate, aluminum nitride, beryllia, zirconia, zircon, forsterite, steatite, spinel, mullite, and titania, beads obtained by spherically shaping the above, glass fibers, and the like. These inorganic fillers may be used alone, or two or more may be used in combination. The usage amount of the inorganic filler is preferably 10 to 500 parts by mass, more preferably 20 to 300 parts by mass, and particularly preferably 30 to 100 parts by mass based on 100 parts by mass of the total amount of the component (A1), the component (A2), and the component (B).

As necessary, it is possible to further add additives other than the inorganic filler to the curable resin composition of the present invention. As the additives, for example, it is possible to use normal additives such as non-reactive diluents (plasticizers) such as dioctyl phthalate, dibutyl phthalate, benzyl alcohol, and coal tar; fibrous filler materials such as glass fiber, pulp fiber, synthetic fiber, and ceramic fiber; a reinforcing material such as glass cloth or aramid cloth, and carbon fiber; a pigment; silane coupling agents such as γ-aminopropyltriethoxysilane, N-β-(aminoethyl)-γ-aminopropyltriethoxysilane, N-β-(aminoethyl)-N'-β-(aminoethyl)-γ-aminopropyltriethoxysilane, γ-anilinopropyltriethoxysilane, γ-glycidoxypropyltriethoxysilane, β-(3,4-epoxycyclohexyl) ethyl triethoxysilane, vinyltriethoxysilane, N-β-(N-vinylbenzylaminoethyl)-γ-aminopropyltriethoxysilane, γ-methacryloxypropyltrimethoxysilane, γ-chloropropyltrimethoxysilane, and γ-mercaptopropyltrimethoxysilane; lubricants such as candelilla wax, carnauba wax, wood wax, insect wax, bees wax, lanolin, whale wax, montan wax, petroleum wax, aliphatic wax, aliphatic ester, aliphatic ether, aromatic ester, and aromatic ether; thickening agents; thixotropic agents; antioxidants; light stabilizers; ultraviolet absorbers; flame retardants; antifoam agents; rust preventives; colloidal silica, colloidal alumina, and the like. In the present invention, furthermore, it is also possible to use tacky resins such as xylene resin and petroleum resin in combination.

[Usage]

The curable resin composition of the present invention is used as an adhesive for bonding a structural material in the fields of automobiles, vehicles (bullet trains, trains, and the like), civil engineering, buildings, ships, airplanes, and the space industry. It is also possible to use the curable resin composition of the present invention as an adhesive for general office work, medical use, and electronic materials. Examples of adhesives for electronic materials include interlayer adhesives of multilayer substrates such as build-up substrates, adhesives for semiconductors such as die bonding agents and underfill, underfill for BGA reinforcement, anisotropic conductive films (ACF), and mounting adhesives such as anisotropic conductive paste (ACP), and the like.

EXAMPLES

The present invention will be specifically described with reference to Examples. Note that the "%" below is based on mass unless otherwise specified.

[Production Example 1: Production of Composition 1 including Phosphoric acid-Modified Epoxy Resin (A1) and Epoxy Resin (A2)]

In a 2 L 5-neck separable round bottom flask equipped with a Dimroth condenser, a stirring blade, and a nitrogen line, 890.6 g of "Adeka resin EP-4100E" (bisphenol A type epoxy resin, epoxy equivalent: 190 g/eq., manufactured by Adeka Corp.) as the epoxy compound (a2) and 142.4 g of methyl ethyl ketone were mixed. The temperature of the obtained mixture was set at 40° C., and 11.1 g of an 85% by mass phosphoric acid aqueous solution as a phosphoric acid (a1) was gradually added thereto while maintaining the temperature in the system at 60° C. or lower. After completion of the addition, the mixture was heated to 70° C. and stirred for 30 minutes to complete the reaction of phosphoric acid with EP-4100E. After completion of the reaction, the inside of the system was further heated and methyl ethyl ketone and water in the system were removed under conditions of 140° C. and 30 mmHg. At this point, there is a reaction product of phosphoric acid and EP-4100E as well as unreacted EP-4100E in the reaction system. The reaction product of phosphoric acid and EP-4100E corresponds to the phosphoric acid-modified epoxy resin (A1) of the present invention. The unreacted EP-4100E corresponds to the epoxy resin (A2) of the present invention. Theoretically, 64 g of phosphoric acid-modified epoxy resin (A1) and 836 g of epoxy resin (A2) will be present.

Thereafter, 120 g of "Adeka Glycirol ED-523T" (neopentyl glycol glycidyl ether, epoxy equivalent: 140 g/eq., manufactured by Adeka Corp.) which is an epoxy compound not further modified by a phosphoric acid was added to the system as an additional epoxy resin (A2). In this manner, 1020 g of composition 1 including a phosphoric acid-modified epoxy resin (A1) and an epoxy resin (A2) was obtained. The phosphorus content of composition 1 is a theoretical value of 0.29% by mass.

[Production Example 2 Production of Composition 2 including Phosphoric Acid-Modified Epoxy Resin (A1) and Epoxy Resin (A2)]

In a 2 L 5-neck separable round bottom flask equipped with a Dimroth condenser, a stirring blade, and a nitrogen line, 1009.3 g of "Adeka resin EP-4100E" as the epoxy compound (a2) and 151.4 g of methyl ethyl ketone were mixed. The temperature of the obtained mixture was set at 40° C., and 12.6 g of an 85% by mass phosphoric acid aqueous solution as a phosphoric acid (a1) was gradually added thereto while maintaining the temperature in the system at 60° C. or lower. After completion of the addition, the mixture was heated to 70° C. and stirred for 30 minutes to complete the reaction of phosphoric acid with "EP-4100E". After completion of the reaction, the inside of the system was further heated and methyl ethyl ketone and water in the system were removed under conditions of 140° C. and 30 mmHg. At this point, there is a reaction product of phosphoric acid and EP-4100E as well as unreacted EP-4100E in the reaction system. The reaction product of phosphoric acid and EP-4100E corresponds to the phosphoric acid-modified epoxy resin (A1) of the present invention. The unreacted EP-4100E corresponds to the epoxy resin (A2) of the present invention. Theoretically, 72.7 g of phosphoric acid-modified epoxy resin (A1) and 944.3 g of epoxy resin (A2) will be present. In this manner, 1020 g of composition 2 including phosphoric acid-modified epoxy resin (A1) and epoxy resin (A2) was obtained. The phosphorus content of composition 2 is a theoretical value of 0.33% by mass.

[Production Example 3 Production of Composition 3 including Phosphoric Acid-Modified Epoxy Resin (A1) and Epoxy Resin (A2)]

In a 2 L 5-neck separable round bottom flask equipped with a Dimroth condenser, a stirring blade, and a nitrogen line, 1003.4 g of "Adeka resin EP-4100E" as the epoxy compound (a2) and 181.3 g of methyl ethyl ketone were mixed. The temperature of the obtained mixture was set at 40° C., and 18.3 g of an 85% by mass phosphoric acid aqueous solution as a phosphoric acid (a1) was gradually added thereto while maintaining the temperature in the system at 60° C. or lower. After completion of the addition, the mixture was heated to 70° C. and stirred for 30 minutes to complete the reaction of phosphoric acid with EP-4100E. After completion of the reaction, the inside of the system was further heated and methyl ethyl ketone and water in the system were removed under conditions of 140° C. and 30 mmHg.

At this point, there is a reaction product of phosphoric acid and EP-4100E as well as unreacted EP-4100E in the reaction system. The reaction product of phosphoric acid and EP-4100E corresponds to the phosphoric acid-modified epoxy resin (A1) of the present invention. The unreacted EP-4100E corresponds to the epoxy resin (A2) of the present invention. In this manner, 1020 g of composition 3 including phosphoric acid-modified epoxy resin (A1) and epoxy resin (A2) was obtained. The phosphorus content of composition 3 is a theoretical value of 0.48% by mass.

[Production Example 4 Production of Composition 4 including Urethane-Modified Chelate Epoxy Resin and Epoxy Resin (A2)]

1000 g of Adeka polyether G-3000B (polypropylene glycol glyceryl ether having a number average molecular weight of 3000, manufactured by Adeka Corp.) was added to a 2 L 5-neck separable round bottom flask equipped with a Dimroth condenser, a stirring blade, and a nitrogen line and degassed under reduced pressure at 100 to 110° C. and 30 mmHg or less for 1 hour. The inside of the reaction system was cooled to 60° C., 174 g of tolylene diisocyanate was added thereto and reacted at 90 to 100° C. for 3 hours under a nitrogen stream, and, when it was confirmed that the NCO % was 3.6% by mass or less, the reaction was finished. In this manner, a urethane prepolymer was obtained.

2800 g of Adeka resin EP-4100E as an epoxy resin was added to a 5 L 5-neck separable round bottom flask equipped with a Dimroth condenser, a stirring blade, and a nitrogen line and then, at 40° C., 17.6 g of an 85% by mass phosphoric acid aqueous solution was gradually added thereto such that the temperature inside the system did not exceed 60° C. After completion of the addition, the mixture was heated to 70° C. and then stirred for 30 minutes to complete the reaction of phosphoric acid and EP-4100E. At this point, phosphoric acid-modified epoxy resin is formed.

After completion of the reaction, the inside of the system was further heated and water in the system was removed under conditions of 140° C. and 30 mmHg, then 580 g of the urethane prepolymer and 0.075 g of dioctyltin dilaurate were added thereto, and the hydroxyl group in the phosphoric acid-modified epoxy resin and the isocyanate group in the urethane prepolymer were made to react. After confirming that the absorption of NCO disappeared in the IR absorption spectrum, the reaction was finished, and 3395 g of composition 4 including a urethane-modified chelate epoxy resin was obtained. Composition 4 theoretically includes 682.2 g of urethane-modified chelate epoxy resin and 2713.8 g of EP-4100E which is an unreacted epoxy resin. In addition, the phosphorus content of composition 4 is a theoretical value of 0.14% by mass.

Composition 4 does not include the phosphoric acid-modified epoxy compound used in the present invention.

[Production Example 5: Production of Composition 5 including Urethane-Modified Epoxy Resin]

240 g of Adeka polyether G-3000B (propylene oxide addition polymer of glycerin having a number average molecular weight of 3000, manufactured by Adeka Corp.) was added to a 5 L 5-neck separable round bottom flask equipped with a Dimroth condenser, a stirring blade, and a nitrogen line and degassed under reduced pressure for 1 hour under conditions of 100 to 110° C. and 30 mmHg or less. The inside of the reaction system was cooled to 60° C., 42 g of tolylene diisocyanate was added thereto, and the reaction was carried out at 90 to 100° C. for 3 hours under a nitrogen stream. The reaction was finished after confirming that the NCO % was 3.6% by mass or less. Thereafter, 791 g of Adeka Resin EP-4901 (bisphenol F type epoxy resin manufactured by Adeka Corp., epoxy equivalent: 170 g/eq.), 70 g of Adeka Glycirol ED-503 (1,6-hexanediol diglycidyl ether manufactured by Adeka Corp., epoxy equivalent: 165 g/eq.), and 0.08 g of dibutyltin dilaurate as a catalyst for a urethane reaction were added and reacted at 80 to 90° C. The reaction was finished by confirming that the absorption of NCO disappeared in the IR absorption spectrum. In this manner, 1140 g of composition 5 including a urethane modified epoxy resin was obtained. Composition 5 does not include the phosphoric acid-modified epoxy compound used in the present invention.

[Production Example 6: Production of Blocked urethane (B)] 500 g of "Adeka Polyether G-1500" as the polyol (b1) (polypropylene glycol glyceryl ether having a number average molecular weight of 1,500, manufactured by Adeka Corp.) was added to a 1 L 5-neck separable round bottom flask equipped with a Dimroth condenser, a stirring blade, and a nitrogen line and the mixture was degassed under reduced pressure at 100 to 110° C. and 30 mmHg or less for 1 hour. The inside of the reaction system was cooled to 60° C., 221 g of isophorone diisocyanate as the polyisocyanate (b2) and 0.075 g of dioctyltin dilaurate as a catalyst were added thereto and reacted at 90 to 100° C. for 3 hours under a nitrogen stream. When the isocyanate group content (NCO %) in the reaction system was confirmed to be 5.9% by mass, the reaction was finished. In this manner, a polyurethane resin (b3) was obtained. Next, 781 g of polyurethane resin (b3), 150 g of p-tert-butylphenol as a blocking agent (b4), and 0.025 g of dioctyl tin dilaurate as a catalyst were added to a 1 L 5-neck separable round bottom flask equipped with a Dimroth condenser, a stirring blade, and a nitrogen line and reacted at 90 to 100° C. for 3 hours. When it was confirmed that absorption of NCO disappeared in the IR absorption spectrum, the reaction was finished. In this manner, the blocked urethane (B) was obtained.

[Example 1] Production of Curable Resin Composition 1

70 g of composition 1, 30 g of the blocked urethane (B), 7 g of dicyandiamide (DICY) as a latent curing agent (C), 1 g of N,N-dimethyl-N'-phenylurea (Fenuron), and 25 g of calcium carbonate were added into a 500 mL disposable cup, and stirred with a spatula at 25° C. for 5 minutes. Thereafter, the mixture was further stirred using a planetary stirrer to obtain a curable resin composition 1 of the present invention. The adhesive strength of the obtained curable resin composition 1 is shown in Table 1. The adhesive strength (KN/mm) is a value measured by a T-type peeling test performed in accordance with JIS K6854-3, using aluminum and iron as adherends and with a peel rate of 100 mm/min at 23° C.

[Examples 2 to 5, Comparative Examples 1 to 3] Production of Curable Resin Compositions 2 to 5 and Control Curable Resin Compositions 1 to 3

Curable resin compositions of the present invention and control curable resin compositions were prepared by changing the blends as shown in Table 1. The adhesive strength of the obtained curable resin composition was measured in the same manner as in Example 1. The results are shown in Table 1. In Table 1, "EH-5011S" is an imidazole type latent curing agent manufactured by Adeka Corp.

TABLE 1

| | | Example 1 Curable resin composition 1 | Example 2 Curable resin composition 2 | Example 3 Curable resin composition 3 | Example 4 Curable resin composition 4 | Example 5 Curable resin composition 5 | Comparative Example 1 Control curable resin composition 1 | Comparative Example 2 Control curable resin composition 2 | Comparative Example 3 Control curable resin composition 3 |
|---|---|---|---|---|---|---|---|---|---|
| Composition | Composition 1 | 70 | | | 35 | 7 | | | |
| | Composition 2 | | 70 | | | | | | |
| | Composition 3 | | | 70 | | | | | |
| | Epoxy resin (A2) EP-4100E | | | | 35 | 63 | 100 | | |
| | Composition 4 | | | | | | | 70 | |
| | Composition 5 | | | | | | | | 70 |
| | Blocked urethane (B) | 30 | 30 | 30 | 30 | 30 | | 30 | 30 |
| | Latent curing agent DICY | 7 | 7 | 7 | 7 | 7 | 7 | 7 | 7 |
| | Fenuron | 1 | 1 | 1 | 1 | 1 | 1 | | |
| | Latent curing agent EH-5011S | | | | | | | 3 | 3 |
| | Calcium carbonate | 25 | 25 | 25 | 25 | 25 | 25 | 25 | 25 |
| T-type peeling test | Average stress at 23° C. (KN/m) Base material: Al | 4.2 | 4.5 | 5.1 | 3.9 | 3.0 | 0.6 | 1.1 | 0.7 |
| | Base material: Fe | 13.3 | 13.8 | 14.1 | 13.2 | 10.5 | 0.8 | 13.7 | 5.4 |

As shown in Table 1, the curable resin compositions 1 to 5 of the present invention containing all of the phosphoric acid-modified epoxy resin (A1), epoxy resin (A2) (not (A1)), the blocked urethane (B), and the latent curing agent (C) exhibit high adhesive force to both aluminum and iron members. On the other hand, the control curable resin compositions 1 to 3 are inferior in adhesiveness to aluminum. That is, the control curable resin composition 1 not including the phosphoric acid-modified epoxy resin (A1) and the blocked urethane (B) has low adhesive force to both aluminum and iron. The control curable resin composition 2 including the urethane-modified chelate epoxy resin in place of the phosphoric acid-modified epoxy resin (A1) of the present invention has a good adhesive strength to iron but poor adhesive strength to aluminum. The control curable resin composition 3 including a urethane modified epoxy resin in place of the phosphoric acid-modified epoxy resin (A1) of the present invention has low adhesive force to both aluminum and iron.

INDUSTRIAL APPLICABILITY

The resin composition of the present invention has high adhesive strength to aluminum and iron, and, in particular, is a suitable material for producing an adhesive for bonding a structural material for automobiles, vehicles (bullet trains, trains, and the like), civil engineering, construction, ships, airplanes, the space industry, and the like. As the development of automobiles using materials instead of iron accelerates along with recent changes in the automobile industry, it is considered that the adhesives for bonding structural materials using the resin composition of the present invention are suitable as adhesives for bonding structural materials for the automobiles incorporating these material changes, and the present invention is extremely useful industrially.

The invention claimed is:

1. A curable resin composition comprising:
(A1) a phosphoric acid-modified epoxy resin obtained by reacting a phosphoric acid (a1) and an epoxy compound (a2) excluding a urethane-modified epoxy resin and a urethane-modified chelate epoxy resin; and
(A2) an epoxy resin excluding component (A1);
(B) a blocked urethane, which is a compound obtained by further reacting a blocking agent (b4) with a polyurethane resin (b3) obtained by reacting a polyol (b1) and a polyisocyanate (b2), wherein the blocking agent (b4) is at least one compound selected from the group consisting of active methylene compounds, oxime compounds, monohydric alcohols, glycol derivatives, amine compounds, phenols and ε-caprolactams; and
(C) a latent curing agent, wherein the latent curing agent (C) is at least one compound selected from the group consisting of dicyandiamide, hydrazides, 4,4'-diaminodiphenylsulfone, boron trifluoride amine complex salt and ureas,
wherein a phosphorus content in a total mass of component (A1) and component (A2) is 0.01 to 2.0% by mass.

2. The curable resin composition according to claim 1, wherein the epoxy compound (a2) is a bisphenol epoxy resin.

3. An adhesive for bonding a structural material, which uses the curable resin composition according to claim 1.

4. The adhesive for bonding a structural material according to claim 3, which is used for bonding aluminum materials.

* * * * *